United States Patent [19]
Scott et al.

[11] Patent Number: 6,005,059
[45] Date of Patent: Dec. 21, 1999

[54] CLEAR POLYCARBONATE AND POLYESTER BLENDS

[75] Inventors: Christopher Edward Scott, Cambridge, Mass.; John C. Morris; James Rodney Bradley, both of Kingsport, Tenn.

[73] Assignee: Eastman Chemical Company, Kingsport, Tenn.

[21] Appl. No.: 08/996,459

[22] Filed: Dec. 23, 1997

Related U.S. Application Data

[60] Provisional application No. 60/034,994, Dec. 28, 1996.

[51] Int. Cl.$^6$ .............................. C08L 69/00; C08L 67/02
[52] U.S. Cl. ................................................ 525/439
[58] Field of Search ............................................. 525/439

[56] References Cited

U.S. PATENT DOCUMENTS

| | | |
|---|---|---|
| 3,301,777 | 1/1967 | Leonard .................................. 204/290 |
| 3,313,777 | 4/1967 | Elam et al. ................................ 260/47 |
| 3,772,405 | 11/1973 | Hamb ........................................ 260/860 |
| 4,188,314 | 2/1980 | Fox et al. ............................. 260/37 PC |
| 4,263,364 | 4/1981 | Seymour et al. ....................... 428/287 |
| 4,267,096 | 5/1981 | Bussink et al. ....................... 260/40 R |
| 4,391,954 | 7/1983 | Scott ....................................... 525/439 |
| 4,585,854 | 4/1986 | Tung et al. .............................. 528/295 |
| 4,619,976 | 10/1986 | Morris et al. ........................... 525/439 |
| 4,645,802 | 2/1987 | Jackson, Jr. et al. ................... 525/419 |
| 4,786,692 | 11/1988 | Allen et al. ............................. 525/439 |
| 5,034,457 | 7/1991 | Serini et al. .............................. 525/67 |
| 5,104,723 | 4/1992 | Freitag et al. .......................... 428/220 |
| 5,137,970 | 8/1992 | Eckel et al. ............................... 525/67 |
| 5,145,911 | 9/1992 | Eckel et al. ............................... 525/67 |
| 5,310,793 | 5/1994 | Freitag . |
| 5,342,819 | 8/1994 | Takiguchi . |
| 5,461,120 | 10/1995 | Mason . |
| 5,508,344 | 4/1996 | Mason et al. . |

OTHER PUBLICATIONS

Coover, Jr. et al., *Copolyester Molding Composition*, United States Patent Office, Defensive Publication T875,010, published Jun. 9, 1970 (875 O.G. 842).

*Primary Examiner*—David Buttner
*Attorney, Agent, or Firm*—Needle & Rosenberg, P.C.

[57] ABSTRACT

A blend of polycarbonates of dihydroxydiphenyl cycloalkanes and optionally 4,4'-isopropylidenediphenol with polyesters from terephthalic acid, isophthalic acid, neopentyl glycol and 2,2,4,4-tetramethyl-1,3-cyclobutanediol, having the advantage of being colorless and providing an unexpected amount of impact strength, hardness and heat resistance. The polymer blends are especially suitable for the manufacture of clear molded articles, fibers, sheeting, and film.

21 Claims, No Drawings

CLEAR POLYCARBONATE AND POLYESTER BLENDS

CROSS-REFERENCE TO RELATED APPLICATIONS

This application claims priority to U.S. provisional application Ser. No. 60/034,994 filed on Dec. 28, 1996, and the application Ser. No. 60/034,994 is herein incorporated in its entirety.

FIELD OF THE INVENTION

The present invention relates to clear blends of polycarbonates and polyesters. More particularly, the present invention relates to clear blends of polycarbonates of dihydroxydiphenyl cycloalkanes and optionally bisphenol A with polyesters from terephthalic acid, isophthalic acid, neopentyl glycol and 2,2,4,4-tetramethyl-1,3-cyclobutanediol.

BACKGROUND OF THE INVENTION

The polycarbonate of 4,4'-isopropylidenediphenol (bisphenol A polycarbonate) is a well known engineering molding plastic. Bisphenol A polycarbonate is a clear high-performance plastic having good physical properties such as dimensional stability, high heat resistance, and good impact strength. Although bisphenol A polycarbonate has many good physical properties, its relatively high melt viscosity leads to poor melt processability and the polycarbonate exhibits poor chemical resistance.

Blends of the polycarbonates of bisphenol A and various dihydroxydiphenyl cycloalkanes have been used in making plastic films, molded articles, and extruded articles. These polycarbonate blends are especially useful in the performance plastics industry because they tend to have good heat resistance, high melt viscosities suitable for injection molding and extrusion, toughness, and good chemical resistance.

U.S. Pat. No. 5,034,457 discloses blends of dihydroxydiphenyl cycloalkane polycarbonates with a mixture of amorphous thermoplastics, partly crystalline thermoplastics, and rubber used for injection molding. U.S. Pat. No. 5,104,723 discloses blends of dihydroxydiphenyl cycloalkane polycarbonates with amorphous thermoplastics, partially crystalline thermoplastics, and elastomers for the production of films.

However, there has been no disclosure of miscible blends of dihydroxydiphenyl cycloalkane polycarbonates with other materials. Immiscible blend compositions are inadequate for many uses because they are opaque, and generally result in an unacceptable reduction in impact strength and tensile strength.

Clear, miscible blends of any two polymers are rare. The term "miscible" refers to blends that are a mixture on a molecular level wherein intimate polymer-polymer interaction is achieved. Miscible blends are clear, not translucent or opaque. In addition, differential scanning calorimetry testing detects only a single glass transition temperature (Tg) for miscible blends composed of two or more components.

There have been very few clear polycarbonate/polyester blends developed. U.S. Pat. Nos. 4,619,976 and 4,645,802 disclose clear blends based on bisphenol A polycarbonate with polyesters of poly(1,4-tetramethylene terephthalate), poly(1,4-cyclohexylenedimethylene terephthalate) and selected copolyesters and copoly(ester-imides) of poly(1,4-cyclohexylenedimethylene terephthalate). U.S. Pat. No. 4,786,692 discloses clear blends of bisphenol A polycarbonate and polyesters of terephthalic acid, isophthalic acid, ethylene glycol, and 1,4-cyclohexanedimethanol. U.S. Pat. Nos. 4,188,314 and 4,391,954 disclose clear blends of bisphenol A polycarbonate with poly(1,4-cyclohexylenedimethylene terephthalate-co-isophthalate). These polyester blends do have improved chemical resistance and melt processability, when compared to unblended bisphenol A polycarbonate. However, the good heat resistance and impact strength of bisphenol A polycarbonate blends based on these compositions is reduced significantly.

In light of the above, it would be desirable to be able to form clear polyester blends of dihydroxydiphenyl cycloalkane polycarbonates having good melt processability suitable for injection molding. Such blend would be especially suitable for the manufacture of clear molded articles, fibers, sheeting, and film.

SUMMARY OF THE INVENTION

In one embodiment, the blend composition according to the present invention comprises:

(A) about 1 to 99 percent by weight of a polycarbonate comprising a diol component comprising about 5 to 100 mol percent units of a diphenol or mixture of diphenols having the formula

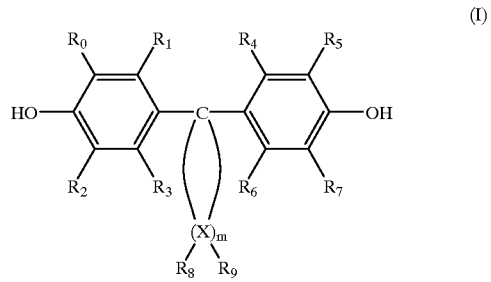

(I)

wherein $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl, X represents carbon, m is an integer of from 4 to 7, and $R_8$ and $R_9$ are independently selected for each X and independently selected of each other from the group consisting of hydrogen and $C_1$–$C_8$ alkyl;

from 0 to about 95 mol percent 4,4'-isopropylidenediphenol units; and from 0 to about 10 mol percent modifying glycol units having 2 to 16 carbons, wherein the total mol percent of diol units is equal to 100 mol percent; and (B) from 1 to 99 percent by weight of a polyester comprising (a) a dicarboxylic acid component comprising from 80 to 100 mol percent dicarboxylic acid units selected from the group consisting of terephthalic acid units, isophthalic acid units, and mixtures thereof; and from 0 to about 20 mol percent modifying dicarboxylic acid units having from 2 to 20 carbons, wherein the total mol percent of dicarboxylic acid units is equal to 100 mol percent; and (b) a glycol component comprising from 0 to 99 mol percent 2,2,4,4-tetramethyl-1,3-cyclobutanediol units, from 1 to 100 mol percent neopentyl glycol units, and 0 to about 10 mol percent modifying glycol units having 2 to 16 carbons, wherein the total mol percent of glycol units is equal to 100 mol percent;

wherein the total units of said polyester is equal to 200 mol percent;
wherein said blend is clear and the total weight percent of said polycarbonate (A) and said polyester (B) is equal to 100 weight percent.

In another embodiment, the invention comprises:

(A) from 1 to 99 percent by weight of a polycarbonate comprising a diol component comprising from 5 to 100 mol percent units of a diphenol or mixture of diphenols having the formula

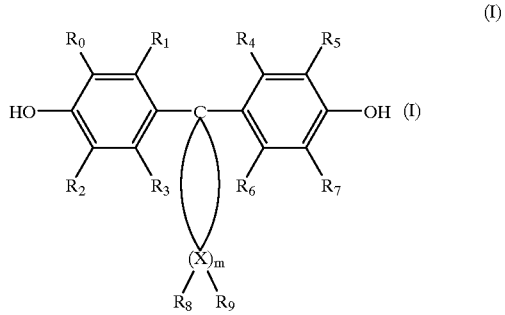

(I)

wherein
$R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl,
X represents carbon,
m is an integer of from 4 to 7, and
$R_8$ and $R_9$ are independently selected for each X and independently selected of each other from the group consisting of hydrogen and $C_1$–$C_8$ alkyl; and
from 0 to about 95 mol percent 4,4'-isopropylidenediphenol units, and from 0 to about 10 mol percent modifying glycol units having 2 to 16 carbons, wherein the total mol percent of diol units is equal to 100 mol percent; and (B) from 1 to 99 percent by weight of a polyester comprising
(a) a dicarboxylic acid component comprising from 80 to 100 mol percent dicarboxylic acid units selected from the group consisting of terephthalic acid units, isophthalic acid units, and mixtures thereof; and from 0 to about 20 mol percent modifying dicarboxylic acid units having from 2 to 20 carbons, wherein the total mol percent of dicarboxylic acid units is equal to 100 mol percent; and
(b) a glycol component comprising from 0 to 100 mol percent 2,2,4,4-tetramethyl-1,3-cyclobutanediol units, from 0 to 100 mol percent neopentyl glycol units, and from 0 to about 10 mol percent modifying glycol units having 2 to 16 carbons, wherein the total mol percent of glycol units is equal to 100 mol percent;
wherein the total units of said polyester is equal to 200 mol percent;
wherein said blend is clear and the total weight percent of said polycarbonate (A) and said polyester (B) is equal to 100 weight percent.

The invention also covers a method of making an article from the clear blend comprising the steps of:
(a) blending polycarbonate (A) and polyester (B);
(b) before, during or after the blending, melting polycarbonate (A) and polyester (B) to form, after the blending and melting, a melt blend;
(c) then cooling the melt blend to form a clear blend composition.

DETAILED DESCRIPTION OF THE INVENTION

The present invention may be understood more readily by reference to the following detailed description of preferred embodiments of the invention and the Examples included therein.

Before the present compositions of matter are disclosed and described, it is to be understood that this invention is not limited to specific synthetic methods or to particular formulations, as such may, or course, vary. It is also understood that the terminology use herein is for the purpose of describing particular embodiments only and is not intended to be limiting.

In this specification, the singular forms "a" "an" and "the" include plural referents unless the context clearly dictates otherwise.

The applicants have unexpectedly discovered clear blends of the polycarbonate of the diphenol of formula (I) with particular polyesters from terephthalic acid, isophthalic acid, 2,2,4,4-tetramethyl-1,3-cyclobutanediol, and neopentyl glycol. The applicants were also surprised to discover clear blends of copolycarbonates of the diphenol of formula (I) and bisphenol A with particular polyesters from terephthalic acid, isophthalic acid, 2,2,4,4-tetramethyl-1,3-cyclobutanediol, and neopentyl glycol.

This discovery was surprising since there are no teachings of clear polycarbonate/polyester blends based on the polycarbonate of a dihydroxydiphenyl cycloalkane. This discovery was particularly surprising since there are no teachings of a polycarbonate/polyester blend having a 2,2,4,4-tetramethyl-1,3-cyclobutanediol based glycol component in the polyester. Nor are there any teachings suggesting that such a blend may be clear. Although U.S. Pat. No. 3,301,777 discloses polyesters containing 2,2,4,4-tetramethyl-1,3-cyclobutanediol, there is no suggestion of the benefit of blending a 2,2,4,4-tetramethyl-1,3-cyclobutanediol based polyester with a polycarbonate.

Although U.S. Pat. No. 3,301,777 broadly lists neopentyl glycol (2,2-dimethyl-1,3-propanediol) as a possible modifying glycol of 2,2,4,4-tetramethyl-1,3-cyclobutanediol copolyesters, the copolyester has not been specifically disclosed. Furthermore, there has been no suggestion in the literature that such a copolyester could be blended with a polycarbonate to form a clear blend. Furthermore, there has been no suggestion that such a polycarbonate blend containing a neopentyl glycol homopolyester would also be clear.

In addition to the unexpected clarity of the blend, the applicants were also surprised to find that the polyester portion of the present invention provides an unexpected amount of impact strength, hardness and heat resistance to the polymer blend.

The term "polycarbonate" is herein defined as the condensation product of a carbonate source and a diol source, having a carbonate component containing 100 mol percent carbonate units and a diol component containing 100 mol percent diol units, for a total of 200 mol percent monomeric units. The term "diol" as used herein, includes both aliphatic and aromatic compounds having two hydroxyl groups, while the term "glycol" refers to aliphatic and aromatic/aliphatic compounds having two hydroxyl groups.

The polycarbonate portion of the blend of the present invention is based upon the polycarbonate of the diphenol or mixture of diphenols of formula (I).

(I)

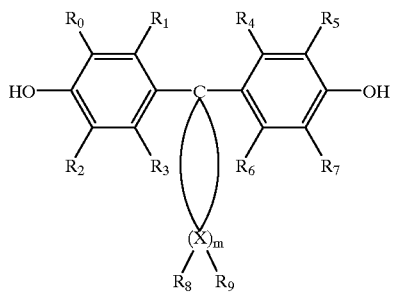

in which $R_0$, $R_1$, $R_2$, $R_3$, $R_4$, $R_5$, $R_6$, and $R_7$ independently of one another are hydrogen, halogen, $C_1$–$C_8$ alkyl, $C_5$–$C_{12}$ cycloalkyl, $C_5$–$C_{12}$ aryl or $C_6$–$C_{12}$ aralkyl, X represents carbon, m is an integer from 4 to 7, and $R_8$ and $R_9$ are, independently for each X and independently of one another, hydrogen or $C_1$–$C_8$ alkyl.

Suitable halogen substituents of the diphenol of formula (I) include, but are not limited to, chlorine, bromine and fluorine. Examples of suitable alkyl sub stituent groups include, but are not limited to, methyl, ethyl, propyl, isopropyl, t-butyl, pentyl, hexyl, heptyl and octyl. Examples of suitable cycloalkyl substituent groups include, but are not limited to, the cyclohexyl, and the methyl-, ethyl-, propyl-, and t-butyl-cyclohexyl moieties. Examples of suitable aryl substituent groups include, but are not limited to, phenyl, benzyl, substituted alkyl phenyl, substituted halophenyl and naphthyl.

The preferred diphenol of formula (I) is a cyclohexyl diphenol shown by formula (11) below, wherein $R_0$ through $R_7$ are selected as described above. The most preferred diphenol of formula (I) is the condensation product of isophorone and phenol known as 3,3,5-trimethylcyclohexane bisphenol, the cyclohexyl diphenol of formula (II) in which $R_0$ through $R_7$ are substituted with hydrogen.

(II)

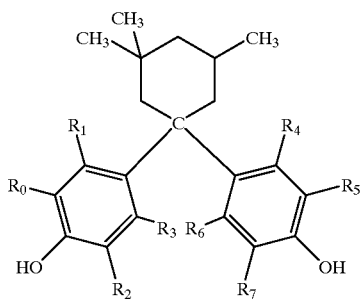

The polycarbonate portion of the blend of the present invention is preferably a copolycarbonate of the diphenol of formula (I) and 4,4'-isopropylidenediphenol, commonly known as bisphenol A, shown below in formula (III).

(III)

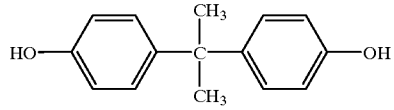

Suitable polycarbonates are those having a diol component containing about 5 to 100 mol percent formula (I) diphenol units and 0 to about 95 mol percent bisphenol A units, preferably about 20 to 50 mol percent formula (I) diphenol units and about 50 to 80 mol percent bisphenol A units, more preferably about 30 to 35 mol percent formula (I) diphenol units and about 65 to 70 mol percent bisphenol A units. One especially suitable commercial copolycarbonate is APEC HT copolycarbonate from Miles, Inc. The approximate diol component structure of APEC HT, as determined by nuclear magnetic resonance spectroscopy (NMR), is 68 mol percent bisphenol A units and 32 mol percent 3,3,5-trimethylcyclohexane bisphenol units.

For the polycarbonates of the invention, suitable carbonate sources for the carbonate units are preferably phosgene; dialkyl carbonate, such as preferably dibutyl carbonate; or diaryl carbonate, such as preferably diphenyl carbonate.

Up to 10 mol percent of the diol component of the polycarbonate portion can be substituted with units of other modifying aromatic diols, besides bisphenol A and formula (I) diphenol, having from 2 to 16 carbons. It is preferable to have no more than 5 mol percent of other modifying polycarbonate present in the polycarbonate portion of the blend, more preferably 0 mol percent. The modifying polycarbonates are preferably polycarbonates of aromatic diols. Suitable examples of other modifying diols include the aromatic diols of U.S. Pat. Nos. 3,030,335 and 3,317,466.

The inherent viscosity of the polycarbonate portion of the blends according to the present invention is preferably at least about 0.3 dL/g, more preferably at least 0.5 dL/g, determined at 25° C. in 60/40 wt/wt phenol/tetrachloroethane.

"Polyester," as used herein, refers to any unit-type of polyester falling within the scope of the polyester portion of the present blend, including but not limited to homopolyesters, copolyesters, and terpolyesters. The polyester portion of the blend of the present invention comprises a dicarboxylic acid component of about 80 to 100 mol percent terephthalic acid and/or isophthalic acid units, and 0 to about 20 mol percent modifying dicarboxylic acid units, and a glycol component of 0 to 100 mol percent 2,2,4,4-tetramethyl-1,3-cyclobutanediol units, 0 to 100 mol percent neopentyl glycol units, and 0 to about 10 mol percent modifying glycol units, wherein the total dicarboxylic acid units is equal to 100 mol percent, the total glycol units is equal to 100 mol percent, with a total polyester units equal to 200 mol percent.

Terephthalic acid and isophthalic acid have been found to be the preferred primary dicarboxylic acids for providing a polyester that forms a clear blend with a copolycarbonate of bisphenol A and the diphenol of formula (I). A higher concentration of terephthalic acid in the polyester than isophthalic acid is preferred because terephthalic acid produces a polyester that provides greater impact strength to the blend. Therefore, it is preferred that the dicarboxylic acid component of the polyester portion be 50 to 100 mol percent terephthalic acid and 0 to 50 mol percent isophthalic acid, more preferably 70 to 100 mol percent terephthalic acid and 0 to 30 mol percent isophthalic acid, with about 100 mol percent terephthalic acid being most preferred.

In addition to terephthalic acid and isophthalic acid, the dicarboxylic acid component of the polyester can be substituted with up to 20 mol percent, but preferably less than 10 mol percent of other modifying dicarboxylic acids having 2 to 20 carbon atoms. Suitable examples of modifying aromatic dicarboxylic acids include 4,4'-biphenyldicarboxylic acid, 1,4-, 1,5-, 2,6-, 2,7-naphthalenedicarboxylic acid, 4,4'-oxybenzoic, trans-4,4'-stilbenedicarboxylic acid, or mixtures thereof. Suitable examples of modifying aliphatic dicarboxylic acids are those containing 2 to 12 carbon atoms, such as oxalic, malonic, succinic, glutaric, adipic, pimelic, suberic, azelaic, and sebacic acids, or mixtures thereof.

The dicarboxylic acid component of the polyester portion of the present blend can be prepared from dicarboxylic acids, their corresponding esters, or mixtures thereof. Examples of esters of the dicarboxylic acids useful in the present invention include the dimethyl, dipropyl, diisopropyl, dibutyl, and diphenyl esters, and the like.

The glycol component of the polyester portion of the present blend is formed from 0 to 100 mol percent 2,2,4,4-tetramethyl-1,3-cyclobutanediol units and 0 to 100 mol percent neopentyl glycol units, and up to 10 mol percent modifying glycol units containing 2 to 16 carbons. In one embodiment, the glycol component is formed from 1 percent neopentyl glycol units. In a further embodiment, the glycol component is formed from 10 percent neopentyl glycol units. About 10 to 90 mol percent 2,2,4,4-tetramethyl-1,3-cyclobutanediol units and about 10 to 90 mol percent neopentyl glycol units preferably form the polyester glycol component, more preferably about 20 to 85 mol percent 2,2,4,4-tetramethyl-1,3-cyclobutanediol and about 15 to 80 mol percent neopentyl glycol units, with about 30 to 80 mol percent 2,2,4,4-tetramethyl-1,3-cyclobutanediol units and about 20 to 70 mol percent neopentyl glycol units being most preferred.

The 2,2,4,4-tetramethyl-1,3-cyclobutanediol can be cis, trans, or a mixture thereof, preferably 45–55 mol percent trans, where the total of cis and trans isomer content is equal to 100 mol percent, more preferably the isomer content is about 50/50 trans/cis.

The glycol component of the polyester portion of the present blend contains 0 to about 10 mol percent, but preferably less than 5 mol percent of other modifying glycol units containing 2 to 16 carbon atoms. Examples of suitable modifying glycols include ethylene glycol, 1,2-propanediol, 1,3-propanediol, 1,4-butanediol, 1,5-pentanediol, 1,6-hexanediol, trans- or cis-1,4-cyclohexanedimethanol, p-xylene glycol, and mixtures thereof. The glycol component can also be modified with 0 to about 10 mol percent polyethylene glycol or polytetramethylene glycols to enhance elastomeric behavior.

The preferred polyester of the present invention is a copolyester formed from 100 mol percent terephthalic acid units, 0 to 100 mol percent 2,2,4,4-tetramethyl-1,3-cyclobutanediol units, and 0 to 100 mol percent neopentyl glycol units. The more preferred polyester is formed from 100 mol percent terephthalic acid units, about 30 to 80 mol percent 2,2,4,4-tetramethyl-1,3-cyclobutanediol units, and about 20 to 70 mol percent neopentyl glycol units. The most preferred polyester contains no units of other modifying dicarboxylic acids nor modifying glycols.

The blends of the present invention are about 1 to 99 weight percent polyester portion and about 1 to 99 weight percent polycarbonate portion, with the total weight percent of the polycarbonate portion and polyester portion preferably being equal to 100 weight percent. The preferred blend of the present invention is about 20 to 99 weight percent polycarbonate and about 1 to 80 weight percent polyester, more preferably about 40 to 99 weight percent polycarbonate and about 1 to 60 weight percent polyester, with a weight percent of about 45 to 55 for both polycarbonate and polyester being most preferred.

Greater concentrations of the copolycarbonate of the blend nearer 99 weight percent produce blends having greater impact strength, heat resistance, and dimensional stability, while blends nearer 99 weight percent polyester have better chemical resistance and melt processability. The most useful blends will be those clear blends having a combination of physical properties best suited for a particular end use, as will be determined on a case by case basis.

The inherent viscosity of the polyester portion of the blends according to the present invention is preferably at least 0.3 dL/g, more preferably at least 0.6 dL/g, determined at 25° C. in 60/40 wt/wt phenol/tetrachloroethane.

The blend compositions of the present invention are clear. The term "clear" is defined herein as an absence of cloudiness, haziness, and muddiness, when inspected visually. The blends of the present invention also exhibit a single glass transition temperature (Tg), as determined by differential scanning calorimetry (DSC).

The chemical resistance and melt processability of the blends of the present invention are good. It is generally known that blending with a polyester improves the chemical resistance and melt processability of polycarbonates. See U.S. Pat. Nos. 4,188,314 and 4,267,096.

The polycarbonate portion of the present blend can be prepared in the melt, in solution, or by interfacial polymerization techniques well known in the art. Suitable methods include the steps of reacting a carbonate source with a diol or diols at a temperature of about 0° C. to 315° C. at a pressure of about 0.1 to 760 mm Hg for a time sufficient to form a polycarbonate. Commercially available polycarbonates that are typically used in the present invention are normally made by reacting an aromatic diol with a carbonate source such as phosgene, dibutyl carbonate or diphenyl carbonate, to incorporate 100 mol percent of carbonate units, along with 100 mol percent diol units into the polycarbonate. For examples of methods of producing polycarbonates, see U.S. Pat. Nos. 5,498,688, 5,494,992, and 5,489,665 which are incorporated by their reference in their entireties.

The polyester portion of the present invention can be made by processes known from the literature such as, for example, by processes in homogeneous solution, by trans-esterification processes in the melt and by two phase interfacial processes. Suitable methods include the steps of reacting one or more dicarboxylic acids with one or more glycols at a temperature of about 100° C. to 315° C. at a pressure of about 0.1 to 760 mm Hg for a time sufficient to form a polyester. See U.S. Pat. No. 3,772,405 for methods of producing polyesters.

The polyester/polycarbonate blends of the present invention can be made by methods which include the steps of blending the polycarbonate and polyester portions of the present invention at a temperature of about 25° C. to 350° C. for a time sufficient to form a clear blend composition. Suitable conventional blending techniques include the melt method and the solution-prepared method. Other suitable blending techniques include dry blending and/or extrusion.

The melt blending method includes blending the polymers at a temperature sufficient to melt the polycarbonate and polyester portions, and thereafter cooling the blend to a temperature sufficient to produce a clear blend. The term "melt" as used herein includes, but is not limited to, merely softening the polymers. For melt mixing methods generally known in the polymers art, see Mixing and Compounding of Polymers (I. Manas-Zloczower & Z. Tadmor eds., Carl Hanser Verlag publisher, N.Y. 1994).

The solution-prepared method includes dissolving the appropriate weight/weight ratio of polyester and polycarbonate in a suitable organic solvent such as methylene chloride or a 70/30 mixture of methylene chloride and hexafluoroisopropanol, mixing the solution, and separating the blend composition from solution by precipitation of the blend or by evaporation of the solvent. Solution-prepared blending methods are generally known in the polymers art.

The melt blending method is the preferred method for producing the blend compositions of the present invention. The melt method is more economical and safer than the solution-prepared method which requires the use of volatile solvents. The melt method is also much more effective in providing clear blends. Any of the clear blends of the present invention that can be prepared by solution blending can also be prepared by the melt method. However, some of the blends of the present invention can be prepared by the melt method, but not by the solution method. Any blending process which provides clear blends of the present invention is suitable. One of ordinary skill in the art will be able to determine appropriate blending methods for producing the clear blends of the present invention.

In addition to the polycarbonate and polyester portions disclosed above, the blend of the present invention can include at least one other modifying polymer. Suitable modifying polymers are those which form miscible blends with the polycarbonate and polyester portions disclosed above. Possible modifying polymers include other polycarbonates, other polyesters, polyamides, polystyrenes, polyurethanes, polyarylates, liquid crystalline polymers, vinyl polymers, and the like, or a mixture thereof. Suitable modifying polymers may be determined by one of ordinary skill in the polymers art by performing traditional miscibility tests with possible modifying polymers.

A polymer may be determined to be a suitable modifying polymer of the blend of the present invention if a clear blend is formed by: 1) blending the modifying polymer with a pre-existing blend containing the polycarbonate and polyester portions, or 2) blending the modifying polymer with the polycarbonate portion prior to the introduction of the polyester portion, or 3) blending the modifying polymer with the polyester portion prior to the introduction of the polycarbonate portion, or 4) mixing the modifying polymer, polycarbonate portion and polyester portion all together prior to blending.

The clear blends of the present invention can still be further modified by the incorporation of blend modifiers to produce performance blends which may not necessarily be clear. For example, polyamides such as nylon 6,6 from DuPont, poly(ether-imides) such as ULTEM poly(etherimide) from General Electric, polyphenylene oxides such as poly(2,6-dimethylphenylene oxide) or poly(phenylene oxide)/polystyrene blends such as the NORYL resins from General Electric, polyesters, polyphenylene sulfides, polyphenylene sulfide/sulfones, poly(ester-carbonates) such as LEXAN 3250 poly(ester-carbonate) (General Electric), polycarbonates other than LEXAN polycarbonate from General Electric, polyarylates such as ARDEL D100 polyarylate (Amoco), polysulfones, polysulfone ethers, poly (ether-ketones) or aromatic dihydroxy compounds can be used as blend modifiers to modify properties or to reduce flammability. The aromatic dihydroxy compounds used to prepare these polymers are disclosed in U.S. Pat. No. 3,030,335 and U.S. Pat. No. 3,317,466.

The blends of the present invention can also contain antioxidants, conventional flame retardants such as phosphorus or halogen compounds, or fillers such as talc or mica, or reinforcing agents such as glass fiber, KEVLAR, or carbon fiber. Additives such as pigments, dyes, stabilizers, plasticizers, etc. can also be used in the polyesters, polycarbonates, and blends of the present invention to further modify the properties of the inventive blends.

The blends of the present invention are useful in producing clear articles of manufacture having improved chemical resistance and melt processability while retaining excellent mechanical properties. These blends are especially useful for making molded articles, fibers, films, and sheeting.

The following examples are intended to illustrate the present invention but are not intended to limit the reasonable scope thereof.

EXAMPLES

The inherent viscosity of the polyesters was determined in 60/40 (wt/wt) phenol/tetrachloroethane at a concentration of 0.5 g/100 mL at 25 C. The glass transition temperatures (Tg's) were determined using a TA 2100 from Thermal Analyst System at a scan rate of 20° C./min. The glycol content of the polyester portion of these blends was determined by proton nuclear magnetic resonance spectroscopy (NMR). Clarity was determined visually. The miscibility of the blends was determined by differential scanning calorimetry and by observation of the clarity of pressed films and molded objects.

The blends of this invention were prepared in two ways:
1) The solution-prepared method of dissolving the appropriate weight/weight ratio of polyester to polycarbonate in methylene chloride or a 70/30 mixture of methylene chloride/hexafluoroisopropanol and after complete solution was obtained, precipitating the blend with methanol.
2) The melt mixing method of dry blending the appropriate weight/weight ratio of polyester to polycarbonate and extruding the blend on a ¾-in Brabender extruder equipped with a screen pack and mixing screw at temperatures of 260–320° C.

The preparation of polycarbonates is well known in the art. The polycarbonate used in the following examples was APEC HT copolycarbonate from Miles, Inc. The bisphenol A polycarbonate used was LEXAN, available from the General Electric Company or MAKROLON 2608, available from Miles, Inc.

The following examples illustrate the preparation of some of the polyesters used in this invention and their miscibility with APEC HT polycarbonate.

Example 1

The blends of this example were prepared by melt mixing. Blends of APEC HT copolycarbonate with polyesters were prepared by an extruder in the melt. The blend compositions were 50 weight percent polycarbonate and 50 weight percent polyester. The pellets were first mixed by tumbling. The blends were prepared in a ¾-in Brabender single screw extruder with a mixing screw. Injection molded parts were prepared on a Boy 22S injection molding machine. Processing temperatures used were in the range of 280° C. to 315° C. Visual inspection was used to determine clarity, and the results are presented in Table 1. Examples 1A through 1F exhibited unexpected visual clarity. Note that the clear blends of Example 1A, 1B, and 1F (melt blended) have the same compositions as the opaque, solution blended Examples 3A, 3B, and 3F. This difference is believed to be due to the more intensive mixing which is achieved in the melt.

Selected mechanical properties of some of the blends prepared in the melt are presented in Table 2. Examples 1A, and 1F which are compositions included in the present invention, exhibit a useful combination of clarity, high heat deflection temperature, and impact strength. The improvements in chemical resistance and melt processability were not analyzed for these Examples. However, it is generally known in the polymers art that the combination of a polycarbonate with a polyester will improve the chemical resistance and melt processability of the polyearbonate. See U.S. Pat. No. 4,188,314 and 4,267,096.

As will be apparent to anyone skilled in the art, these compositions have broad applications including the fabrication of molded articles, fibers, sheeting, or films, particularly where visual clarity is important.

TABLE 1

Melt Blends of Polyesters of Terephthalic Acid,
2,2,4,4-Tetramethyl-1,3-cyclobutanediol, and
Neopentyl Glycol with APEC HT Copolycarbonate
Blend Composition: 50/50 wt./wt. Polycarbonate/Polyester

| Example | NPG, Mol % | TMCD, Mol % | Blend Clarity |
| --- | --- | --- | --- |
| 1A | 100 | 0 | Clear |
| 1B | 90 | 10 | Clear |
| 1C | 77 | 23 | Clear |
| 1D | 45 | 55 | Clear |
| 1E | 18 | 82 | Clear |
| 1F | 0 | 100 | Clear |

NPG = Neopentyl Glycol in Polyester Composition.
TMCD = 2,2,4,4-tetramethyl-1,3-cyclobutanediol (68/32 trans/cis) in Polyester Composition.

TABLE 2

Selected Mechanical Properties of Melt Blends
of Polyesters of Terephthalic Acid,
2,2,4,4-Tetramethyl-1,3-cyclobutanediol, and
Ethylene Glycol with APEC HT Copolycarbonate
50 wt % polycarbonate, 50 wt % polyester

| Example | 1A | 1B |
| --- | --- | --- |
| TMCD/NPG (mol %) | 0/100 | 100/0 |
| Clarity | clear | clear |
| Heat Deflection Temp, ° C. (66 psi, 264 psi) | 103, 90 | 162, 138 |
| Notched Izod Impact Strength (ft-lb/in) | 0.7 | 3.8 |
| Flexural Modulus (psi) | 374,000 | 313,000 |
| Flexural Strength (psi) | 14,100 | 13,660 |

Heat deflection temperature at 66 and 264 psi loading, determined according to ASTM D648.
Notched Izod Impact strength determined at 23° C. according to ASTM D256.
Flexural modulus and flexural strength determined according to ASTM D790.
Visual Clarity.
TMCD = 2,2,4,4-tetramethyl-1,3-cyclobutanediol, NPG = neopentyl glycol.

Example 2 (Control)

This Example illustrates the importance of the presence of units of the diphenol of formula (I) in the diol component of the polycarbonate portion of the present blend. The blend in Example 2 was prepared by the same melt blending method used in Example 1. A 50/50 weight percent polycarbonate/polyester blend was prepared as in Example 1. However, the polycarbonate used was a bisphenol A polycarbonate, MAK-ROLON 2608. The same homopolyester as was used in Example 1A was used for the present example. However, the injection molded parts which were prepared from the blend with APEC HT in the Example 1A was clear while the injection molded parts which were prepared from the blend with bisphenol A polycarbonate in Example 2 were opaque.

These results demonstrate the importance of the polycarbonate structure in achieving visually clear parts.

Example 3

Examples 3A–3F illustrate the miscibility of 50/50 wt/wt solution-prepared blends of APEC HT copolycarbonate and polyesters formed from 100 mol percent terephthalic acid units and varying amounts of 2,2,4,4-tetramethyl-1,3-cyclobutanediol and neopentyl glycol. The results are presented in Table 3.

Example 3D illustrates the preparation of a miscible blend of APEC HT copolycarbonate with a copolyester containing 100 mol percent terephthalic acid, 55 mol percent 2,2,4,4-tetramethyl-1,3-cyclobutanediol (50/50 trans/cis) units, and 45 mol percent neopentyl glycol.

To prepare the polyester for Example 3D, a mixture of 97.0 g (0.5 mol) dimethyl terephthalate, 52.0 g (0.50 mols) neopentyl glycol, 72.0 g (0.50 mol) 2,2,4,4-tetramethyl-1,3-cyclobutanediol (68% trans, 32% cis), 0.076 g titanium tetraisopropoxide (100 ppm Ti), and 0.08 g dibutyltin oxide (300 ppm Sn) was placed in a 500-mL flask equipped with an inlet for nitrogen, a metal stirrer, and a short distillation column. The flask was placed in a Belmont metal bath already heated to 220° C. and the contents of the flask were heated at 220° C. for 2 hours, and at 240° C. for 30 minutes. The temperature was raised to 260° C. and a vacuum of 0.5 mm was gradually applied over the next 3–5 minutes. Full vacuum was maintained for a total time of about 45 minutes. A high melt viscosity, amber polymer was obtained with a glass transition temperature of 116° C. and an inherent viscosity of 0.42 dL/g.

The polyester was then ground to pass a 3-mm screen and 0.25 g of the polyester was dissolved in a 70/30 mixture of methylene chloride/hexafluoroisopropanol with 0.25 g APEC HT copolycarbonate. After solution was complete, the polymers were precipitated by dropping the blend solution into methanol. The precipitate which formed was collected, dried in a vacuum oven for 72 hours at 50° C., and determined to have a single glass transition temperature at 152° C. The blend was then melted and pressed into a thin film. The film appeared visually clear.

Example 3E illustrates the preparation of a clear blend obtained from a polyester containing 100 mol percent terephthalic acid, 82 mol percent 2,2,4,4-tetramethyl-1,3-cyclobutanediol (68/32 trans/cis), and 18 mol percent neopentyl glycol units, having a single glass transition temperature of 163° C.

To prepare the polyester, a mixture of 97.0 g (0.50 mol) dimethyl terephthalate, 108.0 g (0.75 mol) 2,2,4,4-tetramethyl-1,3-cyclobutanediol (68% trans, 32% cis), 26.0 g (0.25 mol) neopentyl glycol, 0.079 g titanium tetraisopropoxide (100 ppm Ti), and 0.083 dibutyl tin oxide (300 ppm Sn) was placed in a 500-mL flask equipped with an inlet for nitrogen, a metal stirrer, and a short distillation column. The flask was placed in a Belmont metal bath already heated to 220° C. The contents of the flask were heated at 220° C. for 2 hours, and at 240° C. for 0.5 hour. The temperature was raised to 260° C. and a vacuum of 0.5 mm was gradually applied over the next 3–5 minutes. Full vacuum was maintained for a total time of about 45 minutes. A high melt viscosity, clear polymer was obtained with a glass transition temperature of 140° C. and an inherent viscosity of 0.28 dL/g.

The polyester was ground to pass a 3-mm screen and 0.25 g of the polyester was dissolved in methylene chloride with 0.25 g APEC HT copolycarbonate. After solution was complete, the polymers were precipitated by dropping the blend solution into methanol. The precipitate was collected, dried in a vacuum oven for 72 hours at 50° C., and determined to have a single glass transition temperature at 163° C. The blend was melted and pressed into a thin film. The film appeared clear to the eye.

Examples 3A–3C and 3F shown in Table 3 further illustrate solution prepared blends of APEC HT copolycarbonate and polyesters. These examples were all prepared in a manner similar to Examples 3D and 3E above, using the amounts shown in Table 3. Example 3C was unexpectedly clear. Example 3F was opaque. Examples 3A and 3B were cloudy.

Examples 3A–3F above show that clear blends of the present invention can be prepared by solution blending of the APEC HT copolycarbonate with the polyester. However, the solution prepared blends of Example 3 were not clear over as broad of a range of polyester compositions as were the blends shown in Example 1, which were prepared by the melt-mixing method. Note that the polyesters of Examples 3A, 3B, and 3F had the same composition as those in 1A, 1B, and 1F, respectively. This difference is believed to be due to the more intensive mixing which is achieved in the melt. Thus, melt blending is the preferred blending method for consistently achieving clear blends.

The invention has been described in detail with particular reference to preferred embodiments thereof, but it will be understood that variations and modification can be effected within the spirit and scope of the invention. Moreover, all patents, patent applications (published and unpublished, foreign or domestic), literature references or other publications noted above are incorporated herein by reference for any disclosure pertinent to the practice of this invention.

TABLE 3

Solution Prepared Blends of Polyesters of Terephthalic Acid, 2,2,4,4-Tetramethyl-1,3-cyclobutanediol, and Neopentyl Glycol with APEC HT Copolycarbonate
Blend Composition: 50 wt. % Polycarbonate/50 wt. % Polyester

| | Polyester Composition | | Blend Visual | DSC |
|---|---|---|---|---|
| Example | NPG, Mol % | TMCD, Mol % | Clarity | Number of Tgs |
| 3A | 100 | 0 | Cloudy | Two |
| 3B | 90 | 10 | Cloudy | Two |
| 3C | 77 | 23 | Clear | One |
| 3D | 45 | 55 | Clear | One |
| 3E | 18 | 82 | Clear | One |
| 3F | 0 | 100 | Opaque | Two |

[a]TMCD = 2,2,4,4-tetramethyl-1,3-cyclobutanediol (68/32 trans/cis), NPG = neopentyl glycol.

Example 4 (Control)

The blends in this example were prepared by the same solvent blending method used in Example 3. However, the polycarbonate used was a MAKROLON 2608, a commercially available bisphenol A polycarbonate. The results are presented in Table 54. Examples 4A through 4F show results using the same polyesters as were used in Examples 3A through 3F, respectively. However, the films which were prepared from blends with APEC HT copolyester in Examples 3C through 3E were clear, while the films which were prepared from blends with bisphenol A polycarbonate in Examples 4C through 3E were opaque.

These results demonstrate the importance of the polycarbonate structure in achieving visually clear films.

TABLE 4

Solution Prepared Blends of Polyesters with Bisphenol A Polycarbonate
50/50 wt. % Polycarbonate/Polyester

| Example | NPG, mol % | TMCD, mol % | Clarity | No. of Tg's |
|---|---|---|---|---|
| 4A | 100 | 0 | Opaque | Two |
| 4B | 90 | 10 | Opaque | Two |
| 4C | 77 | 23 | Opaque | Two |
| 4D | 45 | 55 | Opaque | Two |
| 4E | 18 | 82 | Opaque | Two |
| 4F | 0 | 100 | Opaque | Two |

TMCD = 2,2,4,4-tetramethyl-1,3-cyclobutanediol (68/32 trans/cis), NPG = neopentyl glycol.

These results further demonstrate the importance of the polycarbonate structure in achieving visually clear articles of manufacture, such as molded articles, fibers, sheeting, and films.

We claim:

1. A blend composition comprising:
   (A) from 1 to 99 percent by weight of a polycarbonate comprising a diol component comprising about 5 to 100 mol percent units of a diphenol or mixture of diphenols having the formula

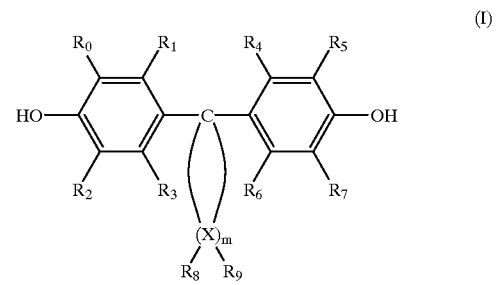

wherein
   $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl,
   X represents carbon,
   m is an integer of from 4 to 7, and
   $R_8$ and $R_9$ are independently selected for each X and independently selected of each other from the group consisting of hydrogen and $C_1$–$C_8$ alkyl;
   from 0 to about 95 mol percent 4,4'-isopropylidenediphenol units; and from 0 to about 10 mol percent modifying glycol units having 2 to 16 carbons, wherein the total mol percent of diol units is equal to 100 mol percent; and
   (B) from 1 to 99 percent by weight of a polyester comprising
   (a) a dicarboxylic acid component comprising from 80 to 100 mol percent dicarboxylic acid units selected from the group consisting of terephthalic acid units, isophthalic acid units, and mixtures thereof; and from 0 to about 20 mol percent modifying dicarboxylic acid units having from 2 to 20 carbons, wherein the total mol percent of dicarboxylic acid units is equal to 100 mol percent; and (b) a glycol component comprising from 0 to 99 mol percent 2,2,4,4-tetramethyl-1,3-cyclobutanediol units, from 1 to 100 mol percent neopentyl glycol units, and 0 to about 10 mol percent modifying glycol units having 2 to 16 carbons, wherein the total mol percent of glycol units is equal to 100 mol percent;

wherein the total units of said polyester is equal to 200 mol percent;

wherein said blend is clear and the total weight percent of said polycarbonate (A) and said polyester (B) is equal to 100 weight percent.

2. The composition of claim 1 wherein said polycarbonate (A) is present at from 40 to 99 weight percent, based on the weight of the blend composition and said polyester (B) is present at from 1 to 60 weight percent, based on the weight of the blend composition.

3. The composition of claim 1, wherein the polycarbonate is present at from 45 to 55% by weight, based on the weight of the blend composition and the polyester is present at from 45 to 55% by weight, based on the weight of the blend composition.

4. The composition of claim 1 wherein said diol component of said polycarbonate comprises from 20 to 50 mol percent diphenol (I) units and from 50 to 80 mol percent 4,4'-isopropylidenediphenol units.

5. The composition of claim 1 wherein said diol component of said polycarbonate comprises from 30 to 35 mol percent diphenol (I) units and from 65 to 70 mol percent 4,4'-isopropylidenediphenol units.

6. The composition of claim 1 wherein the dicarboxylic acid component of said polyester portion consists of 100 mol percent terephthalic acid units.

7. The composition of claim 1 wherein the dicarboxylic acid component of the said polyester comprises from 70 to 100 mol percent terephthalic acid and 0 to 30 mol percent isophthalic acid.

8. The composition of claim 1 wherein said glycol component of said polyester consists essentially of 2,2,4,4-tetramethyl-1,3-cyclobutanediol units and neopentyl glycol units.

9. The composition of claim 1 wherein the 2,2,4,4-tetramethyl-1,3-cyclobutanediol consists of 50 percent cis isomer and 50 percent trans isomer, where the total of the cis and trans isomer is equal to 100 mol percent.

10. The composition of claim 1 wherein said glycol component of said polyester comprises from 20 to 85 mol percent 2,2,4,4-tetramethyl-1,3-cyclobutanediol units and from 15 to 80 mol percent neopentyl glycol units.

11. The composition of claim 6 wherein said glycol component of said polyester comprises from 30 to 80 mol percent 2,2,4,4-tetramethyl-1,3-cyclobutanediol units and from 20 to 70 mol percent neopentyl glycol units.

12. The composition of claim 1 wherein said modifying dicarboxylic acid units of said polyester are selected from the group consisting of 4,4'-biphenyldicarboxylic acid; 1,4-, 1,5-, 2,6-, 2,7-naphthalenedicarboxylic acid; 4,4'-oxydibenzoic acid; trans-4,4'-stilbenedicarboxylic acid; oxalic acid; malonic acid; succinic acid; glutaric acid; adipic acid; pimelic acid; suberic acid; azelaic acid; sebacic acid; and mixtures thereof.

13. The composition of claim 1 wherein said modifying glycol units of said polyester are selected from the group consisting of ethylene glycol, 1,2-propanediol, 1,3-propanediol, 1,4-butanediol, 1,5-pentanediol, 1,6-hexanediol, trans-1,4-cyclohexanedimethanol, cis-1,4-cyclohexanedimethanol, p-xylene glycol, and mixtures thereof.

14. The composition of claim 1 wherein said diphenol of formula (I) is a cyclohexyl diphenol having the formula

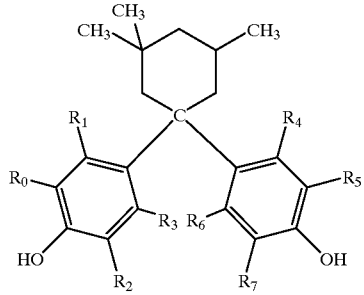

(II)

wherein $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl.

15. The composition of claim 14 wherein said diphenol is 3,3,5-trimethylcyclohexane bisphenol.

16. The composition of claim 1 wherein said blend composition has a single glass transition temperature.

17. The composition of claim 1 wherein said polycarbonate has an inherent viscosity of at least 0.3 dL/g at 25° C. and said polyester has an inherent viscosity of at least 0.3 dL/g at 25° C.

18. A clear article of manufacture made from the composition according to claim 1.

19. A clear article of manufacture made from the composition according to claim 1, selected from the group consisting of molded articles, fibers, films, and sheeting.

20. A method of using the blend of claim 1 to produce a clear article of manufacture comprising:

(a) blending polycarbonate (A) and polyester (B) of claim 1;

(b) before, during or after the blending, melting polycarbonate (A) and polyester (B) to form, after the blending and melting, a melt blend;

(c) then cooling the melt blend to form a clear blend composition.

21. A blend composition comprising:

(A) from 1 to 99 percent by weight of a polycarbonate comprising a diol component comprising from 5 to 100 mol percent units of a diphenol or mixture of diphenols having the formula

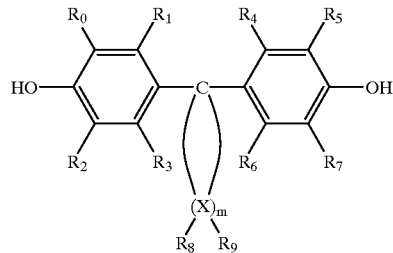

(I)

wherein $R_0$, $R_1$, $R_2$, $R_3$, $R_4$, $R_5$, $R_6$, and $R_7$ are independently selected from the group consisting of hydrogen, halogen, $C_1$–$C_8$ alkyl, $C_5$–$C_{12}$ cycloalkyl, $C_5$–$C_{12}$ aryl, and $C_6$–$C_{12}$ aralkyl, X represents carbon, m is an integer of from 4 to 7, and $R_8$ and $R_9$ are independently selected for each X and independently selected of each other from the group consisting of hydrogen and $C_1$–$C_8$ alkyl; and from 0 to 95 mol percent 4,4'-isopropylidenediphenol units; and from 0 to 10 mol percent modifying glycol units having 2 to 16 carbons, wherein the total mol percent of diol units is equal to 100 mol percent; and (B) from 1 to 99 percent by weight of a polyester comprising
  (a) a dicarboxylic acid component comprising from 80 to 100 mol percent dicarboxylic acid units selected from the group consisting of terephthalic acid units, isophthalic acid units, and mixtures thereof; and from 0 to about 20 mol percent modifying dicarboxylic acid units having from 2 to 20 carbons, wherein the total mol percent of dicarboxylic acid units is equal to 100 mol percent; and
  (b) a glycol component consisting essentially of 0 to 100 mol percent 2,2,4,4-tetramethyl-1,3-cyclobutanediol units, 0 to 100 mol percent neopentyl glycol units, and less than 10 mol percent modifying glycol units having 2 to 16 carbons, wherein the total mol percent of glycol units is equal to 100 mol percent;

wherein the total units of said polyester is equal to 200 mol percent;

wherein said blend is clear and the total weight percent of said polycarbonate (A) and said polyester (B) is equal to 100 weight percent.

* * * * *